UNITED STATES PATENT OFFICE.

HENRY WÄCHTER, OF BIELEFELD, GERMANY.

BLEACHING AND CLEANING COMPOSITION.

SPECIFICATION forming part of Letters Patent No. 546,206, dated September 10, 1895.

Application filed May 15, 1894. Serial No. 511,351. (No specimens.)

*To all whom it may concern:*

Be it known that I, HENRY WÄCHTER, a citizen of the Empire of Germany, residing in Bielefeld, in the Kingdom of Prussia and German Empire, have invented a new and useful Improvement in Bleaching and Cleansing Compositions, of which the following is a specification.

Caustic alkali or a mixture of alkali carbonate and white lime (fat lime) purify very perfectly the fibers of the material treated therewith, but at the same time destroy them. They could, therefore, not be used for bleaching and cleansing purposes. For the purpose of neutralizing the injurious action of these compounds on the fibers zinc, tin, or other metal is dissolved in the above-mentioned caustic liquids. In order to produce the bleaching or cleansing composition in a solid state, soap is chemically added to the solution. The composition produced is of a deep yellow color and has to be bleached by the addition of chlorine water when it is intended to be used for cleaning white materials, (linen, &c.)

To carry my invention into effect I boil one kilogram of water with one kilogram of soda, three hundred grams of unslaked lime and three hundred grams of fat or oil, whereby caustic soda and soap are formed. The calcium carbonate and glycerine produced at the same time will do no harm and therefore need not be removed from the solution. Two grams of granulated zinc are then added. In place of zinc tin or any other metal soluble in caustic alkali may be used. The zinc or other metal dissolves in the hot caustic liquid, producing hydrogen gas. As soon as the generation of hydrogen gas ceases half a kilogram of chlorine water, containing from eight to nine per cent. of chlorine, is poured on the surface of the liquid. The liquid is then boiled for some time and decanted from the sediment which generally contains small parts of the zinc added. Within eight days the liquid becomes solid and crumbles, forming a pulverulent mass.

In using this bleaching and cleansing powder two hundred liters of water are boiled with one kilogram of the powder and half a kilogram of common soap. The materials to be bleached and cleansed are then put into the mixture and boiled repeatedly. After each boiling the materials are taken out of the liquid and rinsed in cold water.

For cleaning boring and shaping machines one pound of the composition described is added to fifteen liters of water. The whole is allowed to boil for a few minutes and then to get cool. A perfect substitute for petroleum, oil or soap water as used for the above mentioned machines, is thus obtained. This mixture keeps for months and prevents the formation of rust on metals.

Having thus described my invention, I claim as new and desire to secure by Letters Patent—

A bleaching and cleansing composition, consisting of a pulverulent mixture of a caustic alkali, zincate of sodium and soap, substantially as set forth.

In witness whereof I have hereunto set my hand in presence of two witnesses.

HENRY WÄCHTER.

Witnesses:
 ARTHUR GOLDSCHMIDT,
 ERNST HEUER.